Aug. 24, 1965        J. A. BERGERON ETAL        3,202,172
POWER UNIT FOR WHEEL-SUPPORTED FLUID CONDUIT
Filed April 15, 1963                                5 Sheets-Sheet 1

INVENTOR.
James A. Bergeron
James S. Stinnett
BY

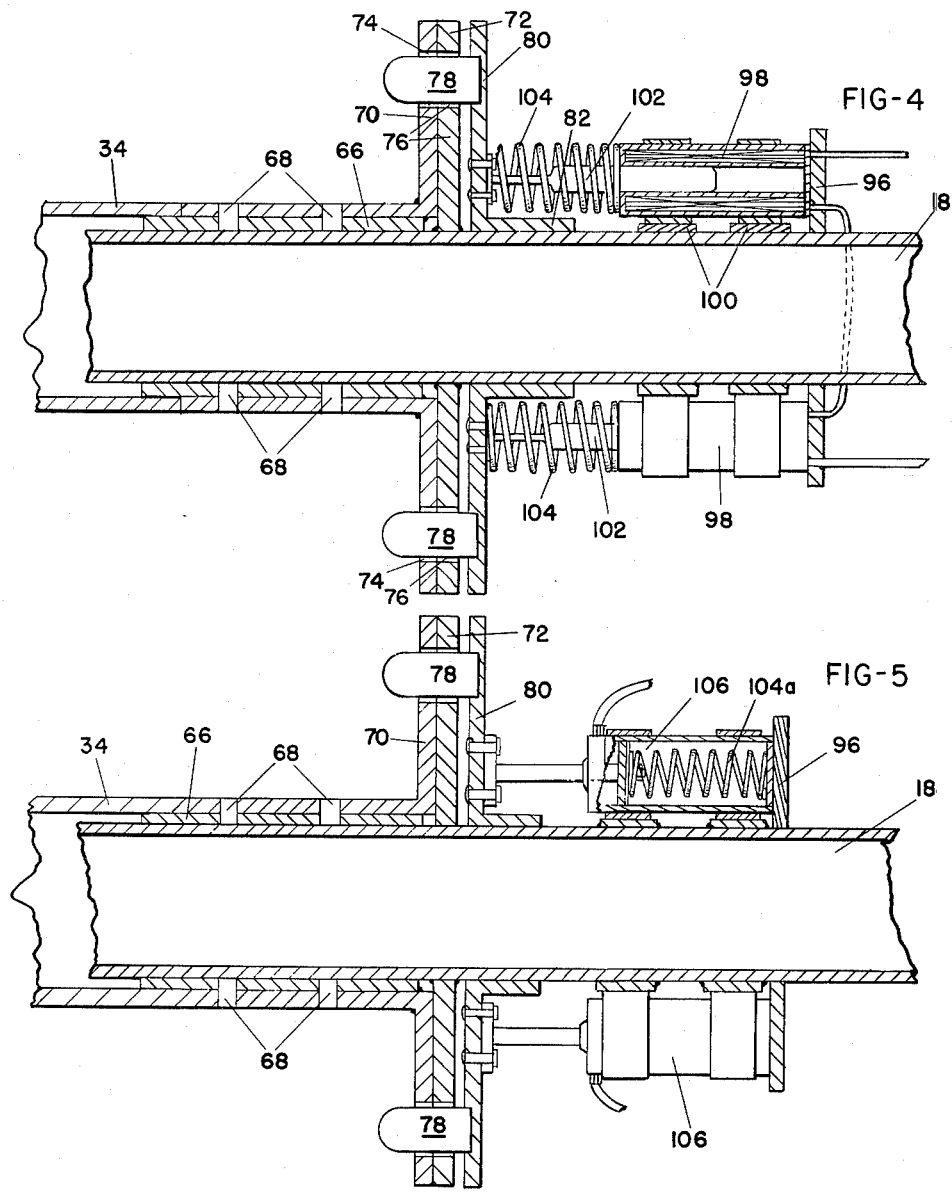

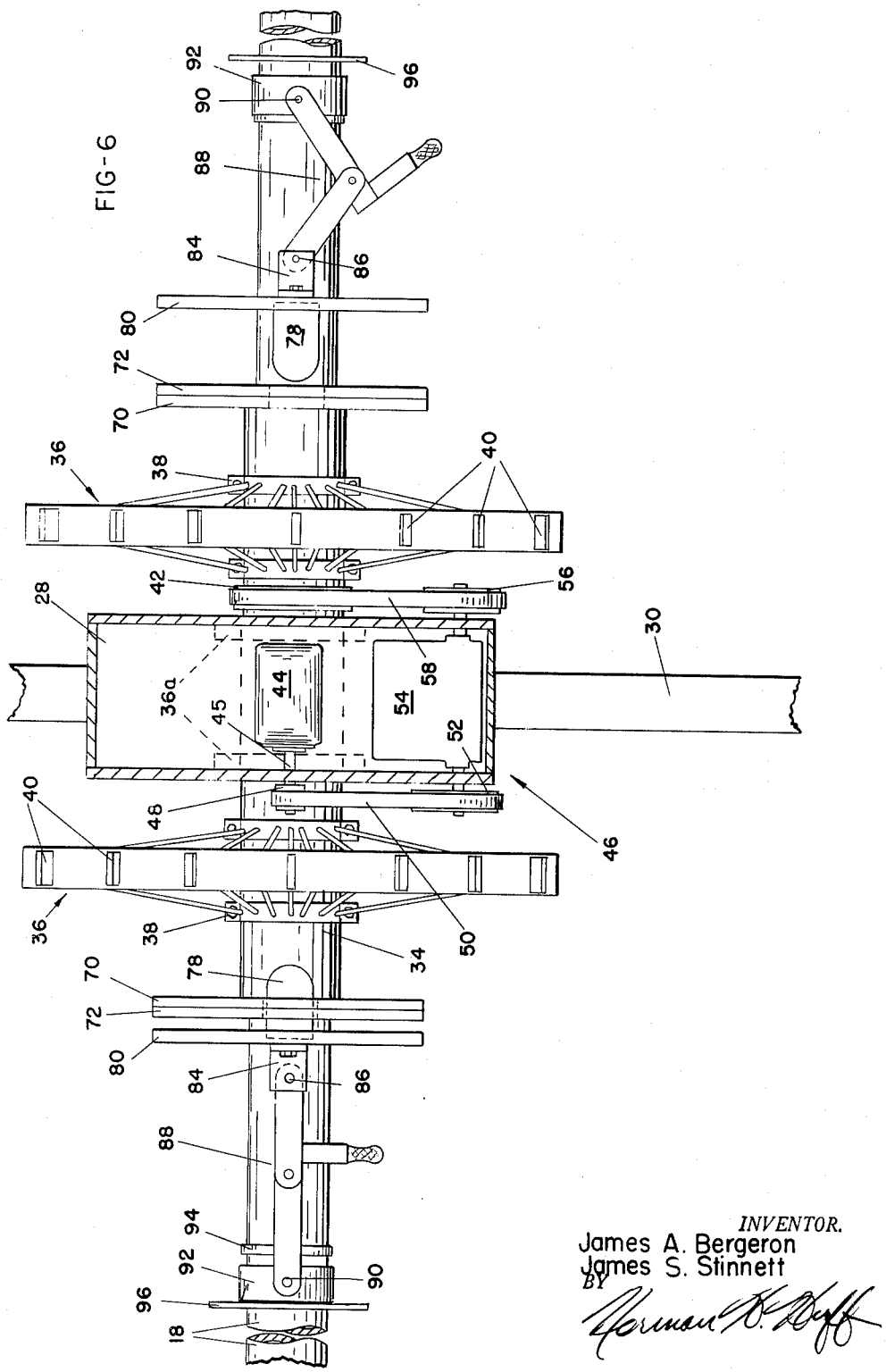
INVENTOR.
James A. Bergeron
James S. Stinnett

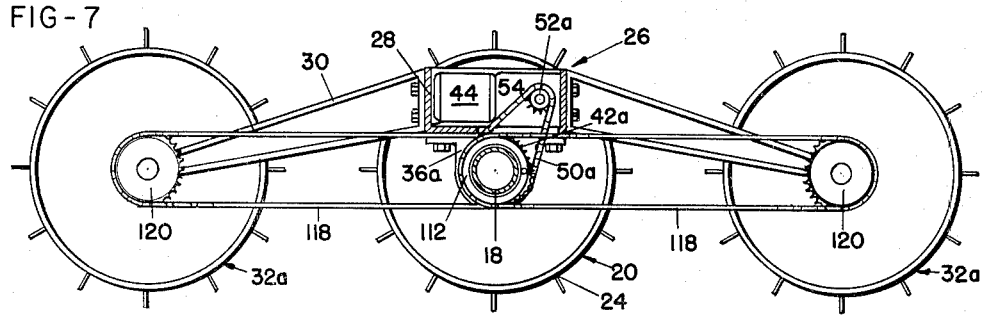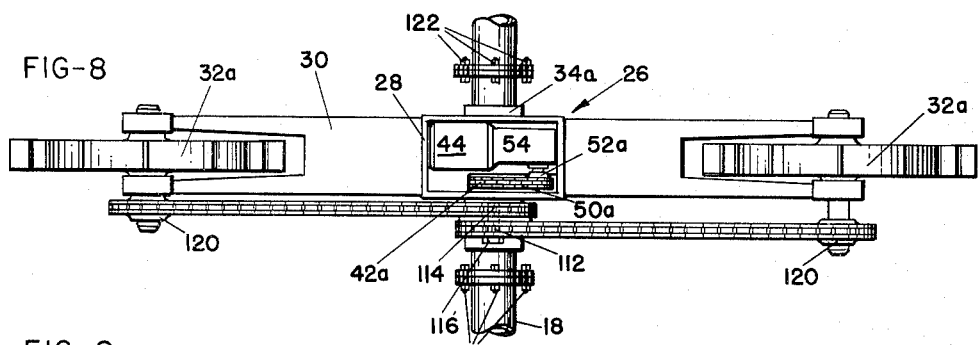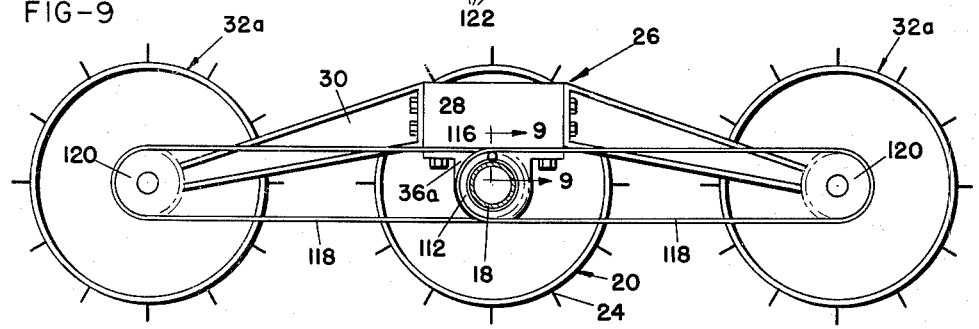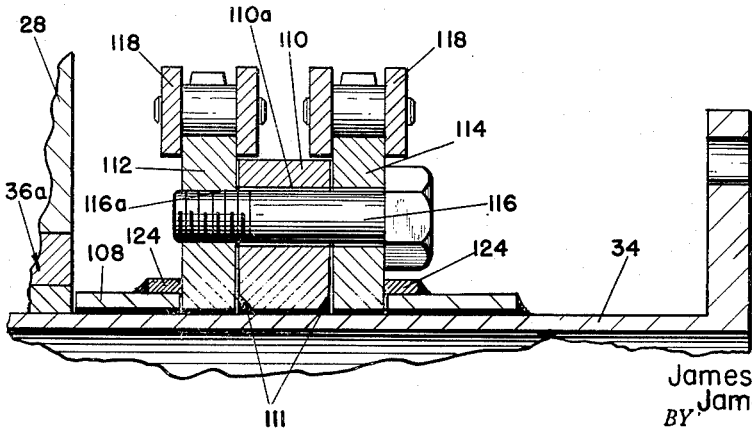

INVENTOR.
James A. Bergeron
BY James S. Stinnett
Norman K. Duff

United States Patent Office 3,202,172
Patented Aug. 24, 1965

3,202,172
POWER UNIT FOR WHEEL-SUPPORTED FLUID CONDUIT
James A. Bergeron and James S. Stinnett, Spokane, Wash., assignors to Anderson-Miller Manufacturing Company, a corporation of Washington
Filed Apr. 15, 1963, Ser. No. 272,973
11 Claims. (Cl. 137—344)

Our present invention relates broadly to irrigation and more particularly to a power unit for a wheel-supported fluid conduit forming an essential part of a wheel move sprinkler system.

Heretofore, there have been a variety of devices proposed and utilized for moving a wheel-supported string of irrigation pipe across the ground. Conventionally, in such devices, a single power unit is connected to the midpoint of the string to drive the wheels through applying rotational force to the pipe itself. The length of a string is variable, depending upon the circumstances encountered, but in some instances, this length may be such as to result in substantial misalignment of the string and thus will hinder its proper distribution of the water delivered thereby. Theoretically, this is occasioned by the fact that the drag against rotation is greater at the center of the string than at the ends and therefore as the string is driven by rotating the pipe from its center, the ends advance across the surface of the ground at the faster rate than the center, resulting in a horizontally bowed string which interferes with the proper application of water. Conventionally, the string is provided with a plurality of sprinkler heads which must be disposed in an upright position at each stand or termini of the successive movements.

Yet another disadvantage arising from the use of a single power unit connected to the center of a string of wheel-supported pipe, is the time which is required for an operator to walk from the end to which the water supply is connected to the center of the string to operate the power unit and then back to the end again to control a valve operating the water supply.

Our present invention seeks to eliminate the aforementioned disadvantages of the prior known power units in a wheel-supported string of irrigation pipe.

It is an object of our present invention to provide a wheel-supported sprinkler system having a single power unit at substantially its midpoint that will enable one to move a long string of pipe across the area to be irrigated to successive stands and yet maintain the string substantially parallel to a vertical plane.

A further object of our present invention lies in the provision of a wheel-supported string of irrigation pipe having a single powered unit at substantially its midpoint, which unit is connected to said string of pipe for coincident movement across the surface of the ground therewith and which may be selectively connected to transmit the torque therefrom directly to the string of pipe and alternately disconnected to rotate freely.

Yet another object of our present invention lies in the provision of a wheel-supported string of irrigation pipe with a power unit substantially at its midpoint, which unit includes a drive tube journaled upon said string of pipe for coaxial rotation relative thereto and having clutch means for selectively coupling and uncoupling said drive tube with said string of pipe at the discretion of the operator.

A still further object of the present invention lies in the provision of a simplified apparatus for moving a wheel-supported string of irrigation pipe, by means of a single powered unit, from stand to stand and maintaining the string of pipe substantially axially parallel to a vertical plane at each stand.

It is still a further object of our present invention to provide a power unit for moving a wheel-supported string of irrigation pipe which unit is simply constructed from a minimum number of parts and yet durable for service over a long period of time.

It is yet another object of the present invention to provide remote operating means for moving a wheel-supported string of irrigation pipe with one or more power units remote from one end so that its operation may be controlled from one end of a string, preferably the end coupled to the supply or main.

These and other objects and advantages of our present invention will be apparent from the following description of the presently preferred embodiment thereof when considered in conjunction with the accompanying exemplifying drawings in which like numerals are employed to designate like parts.

FIGURES 4 and 5 are views similar to FIGURE 3, showing modified operating mechanisms;

FIGURE 6 is a plan view of a portion of the power operating unit, having parts broken away for convenience of illustration, and upon a somewhat reduced scale;

FIGURE 7 is an elevation taken laterally of a string upon a further reduced scale and showing a powered drive unit with portions broken away for convenience of illustration;

FIGURE 8 is a top plan view of the species of FIGURE 7;

FIGURE 9 is an elevational view taken laterally of the string of a hand operated drive unit;

FIGURE 10 is a view taken substantially on a plane indicated by line 9—9 of FIGURE 9 and upon an enlarged scale showing the driving connection;

Figure 1:
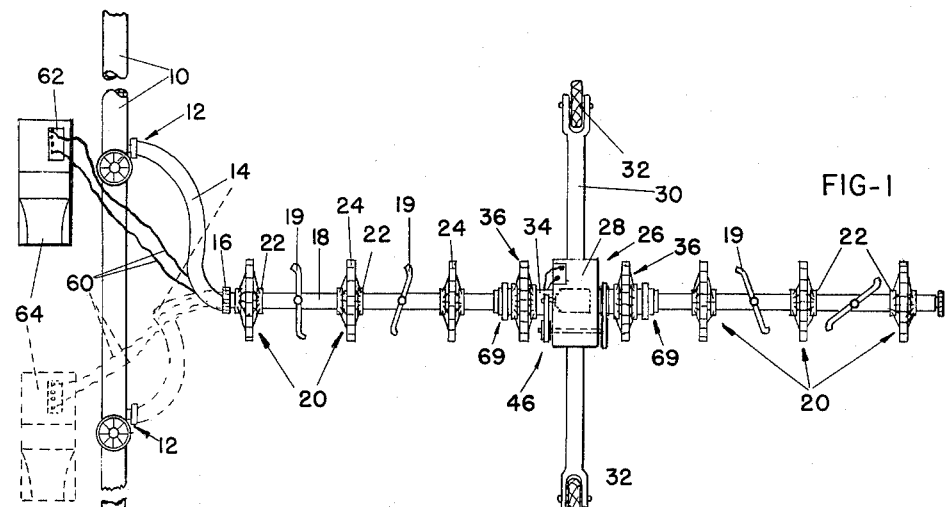
FIGURE 1 is a plan view of a sprinkler system embodying the present invention.

Referring now more particularly to the drawings, for the general arrangement of the invention, there will be seen supply line 10 which is provided with plural control valves 12 to which is releasably connected a flexible hose 14 having its opposite end connected by means of a swivel connection at 16 to the wheel-supported string of irrigation pipe 18, hereinafter sometimes called conduit. Plural axially spaced wheels 20 have their hubs non-rotatably fixed to the conduit 18 and have cleated rims 24 to minimize slippage between the wheel and the surface of the ground.

Numeral 26 indicates in its entirety a power unit which is mounted on the wheel-supported conduit 18 substantially at its midpoint, and comprises a frame or housing 28 which is secured at the midpoint of a torque arm 30 having a ground engaging wheel 32 at each end. A drive tube 34 is journaled on an axis transversely arranged with respect to the axis of the torque arm 30 for rotation with respect to the frame housing 28 and torque arm 30 by means of suitable bearings 36a (FIGURE 9). The drive tube 34 is supported adjacent to each end by means of a ground engaging wheel 36 which is non-rotatably secured at its hub 38 to the drive tube 34 and is provided with cleats 40 in its rim to facilitate traction with the earth upon which the string of irrigation pipe is supported.

A source of rotary power such as reversible electric motor 44 is connected through a drive line 46 which drive line includes a pulley 48 mounted upon the motor shaft 45 which be means of belt 50 drives a pulley 52 of a gear reduction unit 54 which in turn drives a pulley 56 belted by means of V-belt 58 to the pulley 42 fixed with respect to the drive tube 34. It will thus be seen that we have provided a reversible power means drivingly interconnected to rotate the drive tube in the elements 42–58.

Suitable electrical wires 60 are properly connected to energize and control the reversible motor 44 from a remote power and switching station 62 preferably located on a mobilized vehicle such as truck 64 in any well known manner. Preferably the reversible motor 44 is energized from the battery source at 62 which may be recharged thus avoiding the necessity for stringing power supply lines over the fields. Any conventional reversing switch may be employed to control the operation of the motor 44 in conventional manner.

From the description thus far, it will be seen that by energizing the motor 44, one may apply rotary power to the drive tube 34 and the torque will cause the torque arm 30 to move until a particular wheel 32 strikes the surface of the ground whereupon the reaction will cause the drive tube 34 to rotate. Preferably, adjacent to each end, we provide within the drive tube 34 sleeve bearings 66 which are secured to the drive tube 34 as by rivets 68 and are journaled upon the peripheral surface of the conduit 18.

At its ends, the drive tube 34 is provided with clutches 69 which enable an operator to selectively couple and uncouple the drive tube 34 to the conduit 18. A radially disposed annular flange 70 is formed on each end of the drive tube and constitutes a first clutch member. Secured to the conduit 18 as by welding we provide discs 72 which constitute second clutch members and are disposed in close tolerance to the ends of the drive tube 34 to substantially eliminate axial movement of the drive tube 34 with respect to the conduit 18.

When circumferentially positioned relative to each other, the clutch members 70 and 72 have circumferentially spaced axially parallel and aligned apertures 74 and 76 which are adapted to receive therethrough shear pins 78. The shear pins 78 are so termed because of the shearing action applied to the pins by the clutch members 70 and 72, and are secured to a clutch disc 80 which has a sleeve 82 journaled upon the periphery of the conduit 18 for rectilinear movements.

Brackets 84 are rigidly fixed to the clutching disc 80 and by means of pins 86 one end of each break link 88 is pivotally associated with said brackets. The opposed ends of the break links 88 are pivotally secured by means of pins 90 to a collar 92 which may be rotatable about the conduit 18 but confined between a collar 94 and a disc 96 welded to the conduit 18 in spaced relation.

Inspection of the left hand representation in FIGURE 6 of the clutch means 70–96 will reveal that when the break link 88 is in the aligned position, the shear pins 78 are disposed within the apertures 74–76 thus uniting the drive tube 34 to the conduit 18 for coincident rotation. When, however, the break link is broken as shown in the right hand representation of FIGURE 6, the shear pins 78 are removed from the apertures 74 and 76 and the drive tube 34 is released for rotation with respect to the conduit 18.

In FIGURES 4 and 5 we have shown modified means for shifting the clutching disc 80. FIGURE 4 discloses electric solenoids 98, mounted on clamping bands 100–100 and further held by the disc 96. Their armatures 102 are connected to shift the clutching discs 80. Compression springs 104 encircle the armatures 102 and bias the clutching discs 80 into the engaging position wherein the shear pins 78 are disposed within the aligned apertures 74 and 76. Through conventional switching and power means the clutching disc 80 may be withdrawn by energizing the solenoids 98.

In FIGURE 5 fluid pressure cylinders 106 are substituted for the solenoids 98 and the compression springs 104a are disposed within their respective cylinder to accomplish the function above described. Conventional valving control systems utilizing the water pressure in the main 10 or other hydraulic control may be employed to actuate the clutching disc 80 according to manual selection.

*Operation*

In explanation of the sequence of operation; an operator will drive the vehicle 64, containing the powering and switching units 62 to one of the stands or station having a valve 12. The wires 60 are then connected to the power and control unit 62 while the hose 14 is removed to the next successive valve 12, such as the lower valve of FIGURE 1 and as shown by broken lines.

Figure 2:
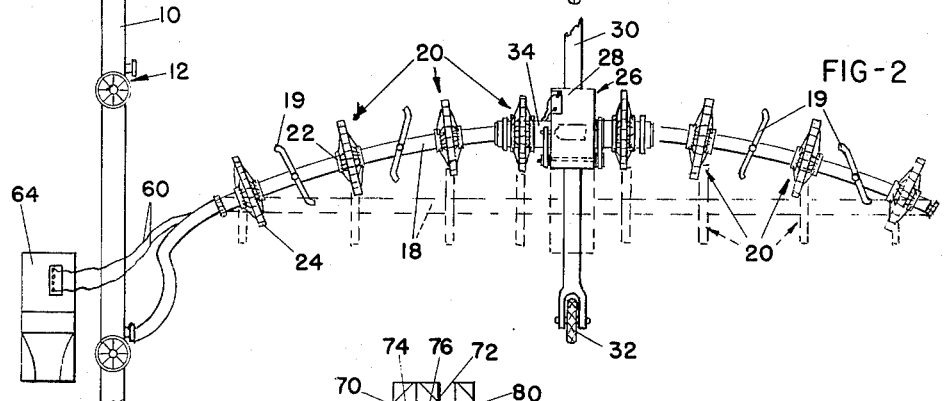
FIGURE 2 is a view similar to FIGURE 1 showing alternate positions of the string of irrigation pipe in full and broken line representation.
Figure 3:
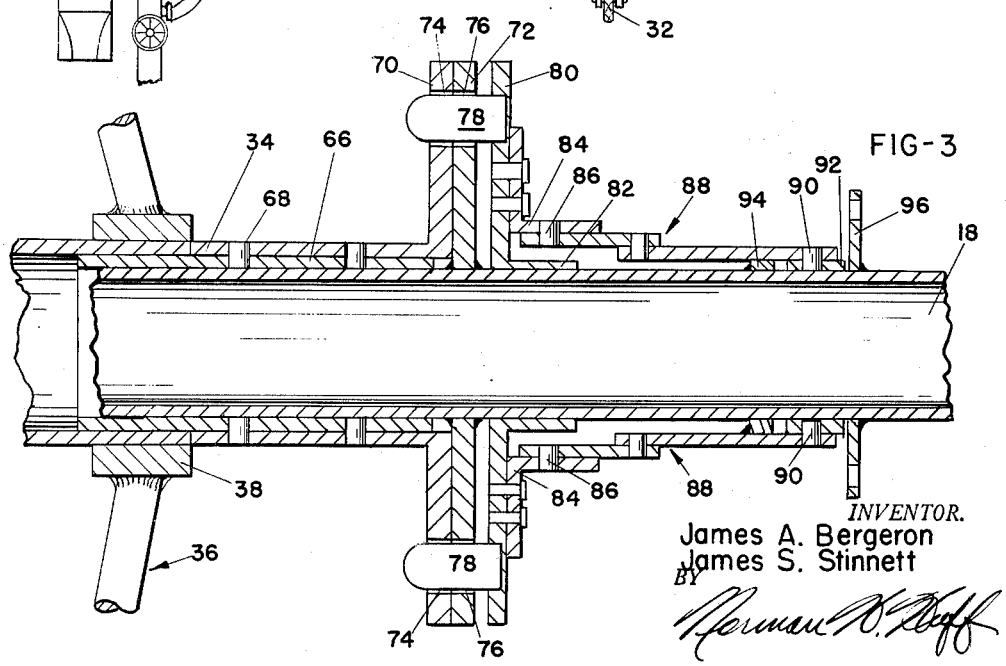
FIGURE 3 is an enlarged fragmentary section through one clutch axially of the string.

By means of the control unit 62, the operator may actuate the solenoids 98 to engage or disengage the clutches 69. By way of illustration, with the clutches 69 engaged, and the motor 44 energized to drive the wheel-supported string of conduit 18 counter-clockwise as viewed from the right end of FIGURE 1, the torque from this force will cause the upper end of the torque arm 30 to lower until its wheel 32 contacts the surface of the ground, whereupon the reaction pressures will impart rotative forces to the drive tube 34 through the transmission line 46. With continued power from the motor 44, the wheel-supported string of conduit 18 will move to the full line position of FIGURE 2 with the ends disposed in advance of the center portion, presumably because the ends have less drag to retard their movement.

At this time, the operator may disengage the clutches 69 and continue supplying driving power by means of motor 44. In this condition the drive tube 34 may rotate freely about the conduit 18, whereupon the wheels 36 will move the center portion of the string of conduit 18 forwardly but will not rotate the balance of the string by means of rotational force, but will drag it across the surface and it will only rotate as much as frictional engagement with the earth requires. This, then, permits the center of the line to be drawn forwardly a greater distance than the ends of the line and enables the operator to substantially align the string with a vertical plane.

In actual practice, the operator would stop the first stage of the advancing movement prior to reaching the station or stand to be watered, so that the ends may advance to some degree while the center is being brought into alignment and the resulting action then dispose the string at the desired location.

In the species disclosed in FIGURES 7–12 we have shown the conduit 18 supported on wheels 20 and the power drive unit 26. A frame or housing 28 has bearings 36 secured thereto. Said bearings journal the drive tube 34 for rotation with respect to the housing, which drive tube is also journaled for rotation about the conduit 18, in FIGURES 7–11. Relative movements of the drive tube and housing 28 longitudinally of the conduit 18 are restricted by means of confining rings 108, one at the outside of each bearing 36. At the ends of the torque arm 30 we have provided ground engaging wheels 32a which are of a circumference equal to the wheels 20 and both of which substantially continually maintain contact with the earth at each side of the conduit 18. In this species the housing contains an electric motor 44 which is coupled to drive through a gear reduction unit 54 a sprocket 52a which in turn through a chain 50a drives a sprocket 42a rigidly fixed to the drive tube 34a. It will thus be seen that by operating the motor in forward and reverse the drive tube 34a may be rotated in opposite directions.

Welded or otherwise fixed at 111 to the drive tube 34a is a driving connection (FIGURES 10–12) which includes a pair of sprockets 112 and 114 journaled for rotation about the drive tube 34a on either side of a drive ring 110. The sprockets have apertures 112a and 114a which may be disposed in alignment with an aperture 110a of the drive ring 110. In FIGURE 10 we have shown that 112a is provided with internal threads which are adapted to receive the threaded end 116a of a bolt 116 which when passed through the aligned apertures engages all of the members against relative rotation.

Figure 11:
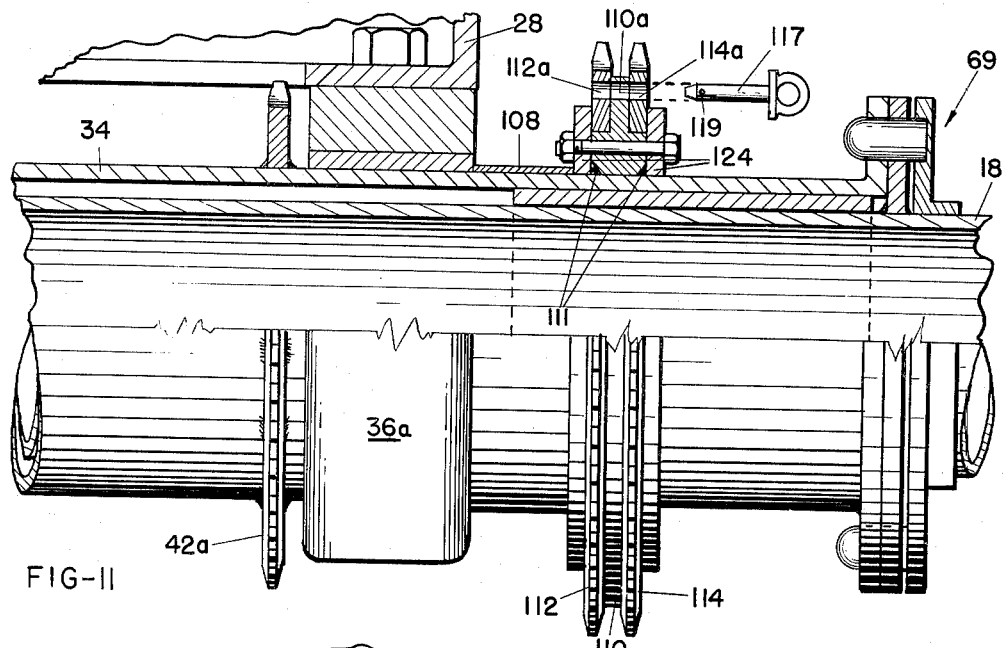
FIGURE 11 is a longitudinal view partially in section showing a modified driving connection associated with a clutch unit.
Figure 12:
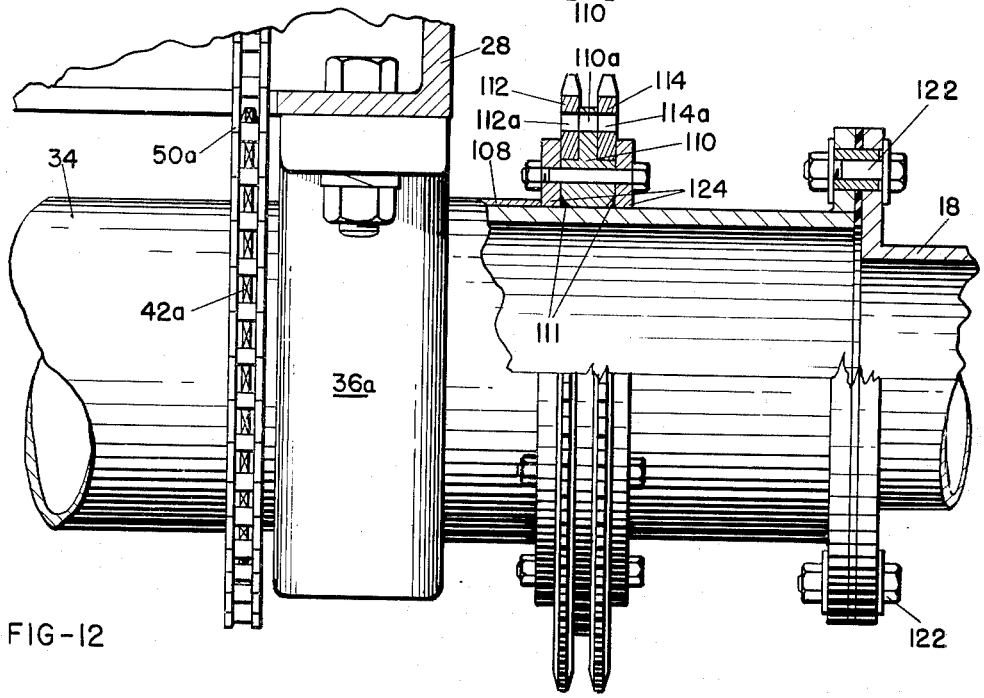
FIGURE 12 is a similar view showing the drive tube connected direcily to the conduit and omitting the clutch unit.

In FIGURES 11 and 12 the releasable connector is shown to be a pin 117 which has a cotter key receiving bore 119 and operates to releasably engage all of the members 110–114 against relative rotation and therefore fixes them with respect to the drive tube 34. Drive chains 118—118 (FIGURES 7–10) each encircle a sprocket 112 or 114 and then extend about a sprocket 120—120 operably connected to drive ground engaging wheels 32a. It will thus be seen that when a fastener 116 or 117 is disposed to engage the elements 110–114 the wheels 32a and the drive tube 34a must rotate coincidentally. However, when the fastener 116 or 117 is removed, the sprockets 112–114 will idle about the drive tube 34a and thus permit the wheels 32a to rotate independently of the drive tube.

Normally, when employing the clutches 69 to engage and disengage the drive tube 34 the fasteners 116 or 117 will at all times be in place to rigidly interconnect the sprockets 112 and 114 with the drive tube 34. However, at other times, as shown in FIGURE 12, the fastener 116–117 will be removed primarily when the clutches 69 are omitted and the drive tube 34 is directly connected to the conduit 18 by means of conventional bolts and nuts 122. It is then possible to move the power unit by hand by disengaging the sprockets 112–114 from the drive tube 34 and thus rotation of one wheel 32a will cause the power unit to move while the sprockets 112–114 rotate as idlers with respect to the drive tube 34 and the drive ring 110.

Confining rings 124—124 are provided to maintain the sprockets 112–114 in proper relationship.

Having thus described our invention we desire to secure by Letters Patent of the United States the following:

1. Driving means in wheel supported fluid conduit, comprising:
   a wheel supported drive tube encircling a portion of said conduit and journaled for rotation thereabout;
   clutch means rigidly interconnecting said drive tube and said conduit for coincident rotation and releasable to permit relative rotation of said drive tube and conduit; and
   manually controllable reversible power means drivingly interconnected to rotate said drive tube.

2. A wheel move sprinkler system, comprising:
   an elongated fluid conduit supported horizontally on plural axially spaced concentric wheels;
   a wheel supported drive tube encircling a portion of said conduit and journaled thereon for concentric rotation;
   clutch means rigidly interconnecting said drive tube and said conduit for coincident rotation and releasable to permit relative rotation thereof; and
   manually controllable reversible power means drivingly interconnected to rotate said drive tube.

3. A wheel move sprinkler system, comprising:
   an elongated fluid conduit supported horizontally on plural axially spaced concentric wheels;
   a wheel supported drive tube encircling a portion of said conduit and journaled thereon for concentric rotation with respect thereto;
   manually controllable reversible power means drivingly interconnected to rotate said drive tube;
   an annular radial flange on each end of said drive tube and fixed with respect thereto, and constituting a first clutch member;
   an annular disc rigidly secured to said conduit at the ends of said drive tube in close tolerance therewith to confine said drive tube against appreciable axial movement relative to said conduit, and constituting a second clutch member; and
   manually controllable means for selectively fixing and releasing said clutch members with respect to each other whereby to alternately fix and release said drive tube with respect to said conduit to selectively effect alternately coincident and independent rotation between said drive tube and said conduit.

4. The invention described in claim 3 and further characterized by said first and second clutch members having aligned apertures; and
   shear pins removably disposed one in each pair of said aligned apertures whereby to releasably secure said clutch members for coincident rotation.

5. The invention described in claim 3 and further characterized by said first and second clutch members having aligned apertures
   said clutch members having circumferentially spaced axially aligned apertures coincident to the apertures of said opposed clutch member;
   a clutching disc mounted upon said conduit outwardly of said second named clutch members for movement axially of said conduit;
   circumferentially spaced shear pins secured to said clutching disc and coaxial with said aligned apertures; and
   means for shifting said clutching disc axially of said conduit for disposing said shear pins in said aligned apertures whereby to releasably fix said clutch members relative to each other.

6. The invention defined in claim 5 wherein the means for shifting said clutching disc comprises:
   a manually operable break link pivotally secured with respect to said clutching disc and said conduit for advancing said clutching disc to a position with said shear pins disposed in said aligned apertures and retracting said clutching disc to withdraw said shear pins from said aligned apertures.

7. The invention defined in claim 5 wherein the means for moving said clutching disc comprises:
   a resilient member urging said clutching disc toward disposition of said shear pins in said aligned apertures; and
   an electrically operated solenoid for withdrawing said clutching disc and shear pins therefrom.

8. The invention defined in claim 5 wherein the means for moving said clutching disc comprises:
   a resilient member urging said clutching disc toward disposition of said shear pins in said aligned apertures; and
   a fluid pressure operated servo motor for withdrawing said clutching disc and shear pins therefrom.

9. Driving means in wheel-supported fluid conduit, comprising:
   a drive tube encircling a portion of said conduit and journaled for rotation thereabout;
   clutch means rigidly interconnecting said drive tube and said conduit for coincident rotation and releasable to permit relative rotation of said drive tube and conduits; and
   manually controllable means drivingly interconnected to rotate said drive tube.

10. Driving means in wheel-supported fluid conduit, comprising:
    a powered drive tube disposed coaxially with said conduit;
    means connecting said drive tube to said conduit for coincident rotation therewith;
    power means for rotating said drive tube about its axis; and means for rendering said power means ineffective.

11. A wheel move sprinkler system, comprising:
    an elongated fluid conduit supported horizontally on plural axially spaced concentric wheels;
    a wheel-supported drive tube coaxial with said conduit and secured thereto for concentric rotation with respect thereto;
manually controllable reversible power means drivingly interconnected to rotate said drive tube;
clutch means rigidly interconnecting said drive tube coaxial with said conduit and secured thereto for concentric rotation with respect thereto;
manually controllable reversible power means drivingly interconnected to rotate said drive tube;
manually controlled power means drivingly interconnected to rotate said drive tube;
means drivingly interconnecting said wheels and said drive tube; and
means for releasing the driving connection between said wheels and said drive tube.

References Cited by the Examiner
UNITED STATES PATENTS

| | | | |
|---|---|---|---|
| 2,665,169 | 1/54 | Tipton | 137—344 |
| 2,946,515 | 7/60 | Jensen | 239—212 |

M. CARY NELSON, *Primary Examiner.*